(12) United States Patent  (10) Patent No.:  US 12,583,252 B2
Ha et al.  (45) Date of Patent:  Mar. 24, 2026

(54) WHEEL STRUCTURE AND METHOD OF CONTROLLING WHEEL STRUCTURE

(71) Applicants: Hyundai Motor Company, Seoul (KR); Kia Corporation, Seoul (KR)

(72) Inventors: Ji Woo Ha, Suwon-si (KR); Hun Keon Ko, Anyang-si (KR); Tae Yu Kim, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 455 days.

(21) Appl. No.: 18/134,288

(22) Filed: Apr. 13, 2023

(65) Prior Publication Data

US 2024/0109365 A1     Apr. 4, 2024

(30) Foreign Application Priority Data

Sep. 30, 2022     (KR) ......................... 10-2022-0125479

(51) Int. Cl.
*B60B 19/04*          (2006.01)
*B60B 9/28*           (2006.01)

(52) U.S. Cl.
CPC ................ *B60B 19/04* (2013.01); *B60B 9/28* (2013.01)

(58) Field of Classification Search
CPC ......... B60B 19/00; B60B 19/04; B60B 15/22; B60B 9/28; A61G 65/06; A61G 65/061; B62D 57/024
See application file for complete search history.

(56) References Cited

U.S. PATENT DOCUMENTS

| | | | | |
|---|---|---|---|---|
| 1,524,373 | A | * | 1/1925 | Vandenberg .............. B60B 9/28 |
| | | | | 152/15 |
| 5,492,390 | A | | 2/1996 | Kugelmann, Sr. |
| 7,380,618 | B2 | * | 6/2008 | Gunderson ........ B62D 49/0635 |
| | | | | 180/7.1 |
| 7,503,567 | B2 | | 3/2009 | Frankie |
| 7,896,360 | B2 | | 3/2011 | Buma |
| 8,172,026 | B2 | | 5/2012 | Yamazaki |
| 8,307,923 | B2 | | 11/2012 | Lin et al. |
| 9,757,978 | B1 | | 9/2017 | Emigh |
| 9,878,576 | B2 | * | 1/2018 | Hein ....................... B60B 19/04 |
| 9,909,633 | B2 | | 3/2018 | Tanahashi et al. |
| 11,014,402 | B2 | | 5/2021 | Fourdrinier |
| 11,155,131 | B1 | * | 10/2021 | Droznin ............... B60B 15/263 |
| 11,701,274 | B2 | | 7/2023 | Ko et al. |

(Continued)

FOREIGN PATENT DOCUMENTS

| | | |
|---|---|---|
| CN | 2461792 Y | 11/2001 |
| CN | 107856474 A | 3/2018 |

(Continued)

*Primary Examiner* — Kip T Kotter
(74) *Attorney, Agent, or Firm* — Banner & Witcoff, Ltd.

(57)          ABSTRACT

Disclosed is a wheel structure including a first hub member, a plurality of spokes that are provided in a circumferential direction (C1) of the first hub member, protrude outward from the first hub member in an outward direction (R1) intersecting the circumferential direction (C1), and have sides coupled to the first hub member, guide parts to which the plurality of spokes are slidably coupled, and a second hub member to which sides of the guide parts are rotatably coupled, wherein the plurality of spokes include a rotation spoke rotatably coupled to the first hub member.

20 Claims, 12 Drawing Sheets

(56)　　　References Cited

U.S. PATENT DOCUMENTS

| | | | |
|---|---|---|---|
| 2004/0135326 A1 | 7/2004 | Palmers et al. | |
| 2008/0288128 A1 | 11/2008 | Gunderson et al. | |
| 2010/0147101 A1 | 6/2010 | Yamazaki | |
| 2010/0164189 A1 | 7/2010 | Buma | |
| 2013/0340902 A1 | 12/2013 | Kemeny | |
| 2014/0265536 A1 | 9/2014 | Hein | |
| 2016/0230824 A1 | 8/2016 | Tanahashi et al. | |
| 2017/0349003 A1 | 12/2017 | Joso et al. | |
| 2018/0022148 A1 | 1/2018 | Lin | |
| 2018/0073600 A1 | 3/2018 | Lippman et al. | |
| 2018/0257429 A1* | 9/2018 | Fourdrinier | B60B 25/02 |
| 2019/0092091 A1 | 3/2019 | Daniels | |
| 2020/0292004 A1 | 9/2020 | Lee | |
| 2021/0323346 A1 | 10/2021 | Lee | |
| 2021/0354508 A1 | 11/2021 | Flick et al. | |
| 2022/0168161 A1 | 6/2022 | Ko et al. | |
| 2022/0379980 A1 | 12/2022 | Choi et al. | |
| 2022/0388339 A1* | 12/2022 | Jo | B60B 9/26 |

FOREIGN PATENT DOCUMENTS

| | | | | | | |
|---|---|---|---|---|---|---|
| CN | 110126544 | A | | 8/2019 | | |
| CN | 110843414 | A | | 2/2020 | | |
| CN | 110901298 | B | | 9/2022 | | |
| FR | 3041284 | A1 | | 3/2017 | | |
| JP | 2018-531843 | A | | 11/2018 | | |
| JP | 2022-085844 | A | | 6/2022 | | |
| KR | 10-2003-0087639 | A | | 11/2003 | | |
| KR | 10-2008-0083708 | A | | 9/2008 | | |
| KR | 10-2009-0092323 | A | | 8/2009 | | |
| KR | 10-2013-0037808 | A | | 4/2013 | | |
| KR | 10-2015-0075574 | A | | 7/2015 | | |
| KR | 10-2015-0102886 | A | | 9/2015 | | |
| KR | 10-2016-0098078 | A | | 8/2016 | | |
| KR | 20160129248 | A | * | 11/2016 | | B60B 19/00 |
| KR | 20160131132 | A | * | 11/2016 | | B60B 19/00 |
| KR | 10-2017-0083854 | A | | 7/2017 | | |
| KR | 10-2018-0126576 | A | | 11/2018 | | |
| KR | 102278493 | B1 | | 7/2021 | | |
| KR | 102422354 | B1 | | 7/2022 | | |
| RU | 145668 | U1 | | 9/2014 | | |

* cited by examiner

WHEEL STRUCTURE AND METHOD OF CONTROLLING WHEEL STRUCTURE

CROSS-REFERENCE TO RELATED APPLICATION

This application claims the benefit of priority to Korean Patent Application No. 10-2022-0125479, filed in the Korean Intellectual Property Office on Sep. 30, 2022, the entire contents of which are incorporated herein by reference.

TECHNICAL FIELD

The present disclosure relates to a wheel structure and a method of controlling the wheel structure, and more particularly, to a wheel structure having a structure of which a shape is changed according to a driving state, and a method of controlling the wheel structure.

BACKGROUND

Mobile robots are roughly classified into a "foot" type robot capable of walking motion using a foot-shaped structure and a "wheel" type robot capable of driving motion using wheels. In the case of the foot-type robot, non-flat environments, such as stairs or rough terrain may be easily overcome, but a movement speed on a flat ground is low, and energy use efficiency is degraded. On the other hand, in the case of the wheel-type robot, a movement speed on a flat ground is high, and energy use efficiency is high, but driving performance is significantly reduced in non-flat environments, such as stairs or rough terrain.

SUMMARY

The following summary presents a simplified summary of certain features. The summary is not an extensive overview and is not intended to identify key or critical elements.

Systems, apparatuses, and methods are described for a wheel structure and controlling of the wheel structure. A wheel structure may comprise a first hub, a plurality of spokes coupled to the first hub such that the plurality of spokes are provided along a circumferential direction of the first hub and protrude outward from the first hub, a plurality of guide parts to which the plurality of spokes are slidably coupled, and a second hub to which sides of the guide parts are rotatably coupled. The plurality of spokes may comprise a rotation spoke rotatably coupled to the first hub.

A method of controlling the wheel structure may comprise causing a front portion of the wheel structure to approach a stepped section protruding upward, moving the second hub with respect to the first hub in an upward direction, and causing the second hub to rotate onto the stepped section.

The method of controlling the wheel structure may also, or alternatively, comprise moving the first hub relative to the second hub in a rearward direction, rotating the second hub in a forward movement direction, and after the moving the first hub relative to the second hub in the rearward direction: moving the first hub relative to the second hub and rotating the second hub in a rearward movement direction.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

To compensate for the disadvantages of foot-type robots and of the wheel-type robots, robots may be developed in which the advantages of the two types of robots are combined. For example, i) a wheel may be attached to a leg-shaped structure provided in the foot-type robot, or ii) a shape of the wheel provided in the wheel-type robot may be made changeable, so as to overcoming obstacles such as stairs.

In the case of i) the size of the wheel attached to the leg-shaped structure may be limited, a load may be applied to a joint region formed in a leg-shaped structure due to the wheel, and thus a durability of the robot may be adversely affected. In the case of ii) the shape of the wheel may temporarily deform, e.g., in response to and/or to accommodate the shapes of obstacles, such as stairs, but may not be able to change sufficiently and/or may have further difficulty allowing the robot to traverse relatively high obstacles.

Hereinafter, a wheel structure and a method of controlling the wheel structure according to the present disclosure will be described with reference to the accompanying drawings.

The wheel structure according to the present disclosure has a wheel structure configured to drive on a substantially flat surface, such as the ground and configured to traverse non-flat surfaces or structures, such as stairs and/or rough and/or irregular terrain, by changing a shape according to a state (e.g., shape) of the non-flat surface and/or by performing a walking-type movement (e.g., a movement that mimics human walking).

Figure 1:
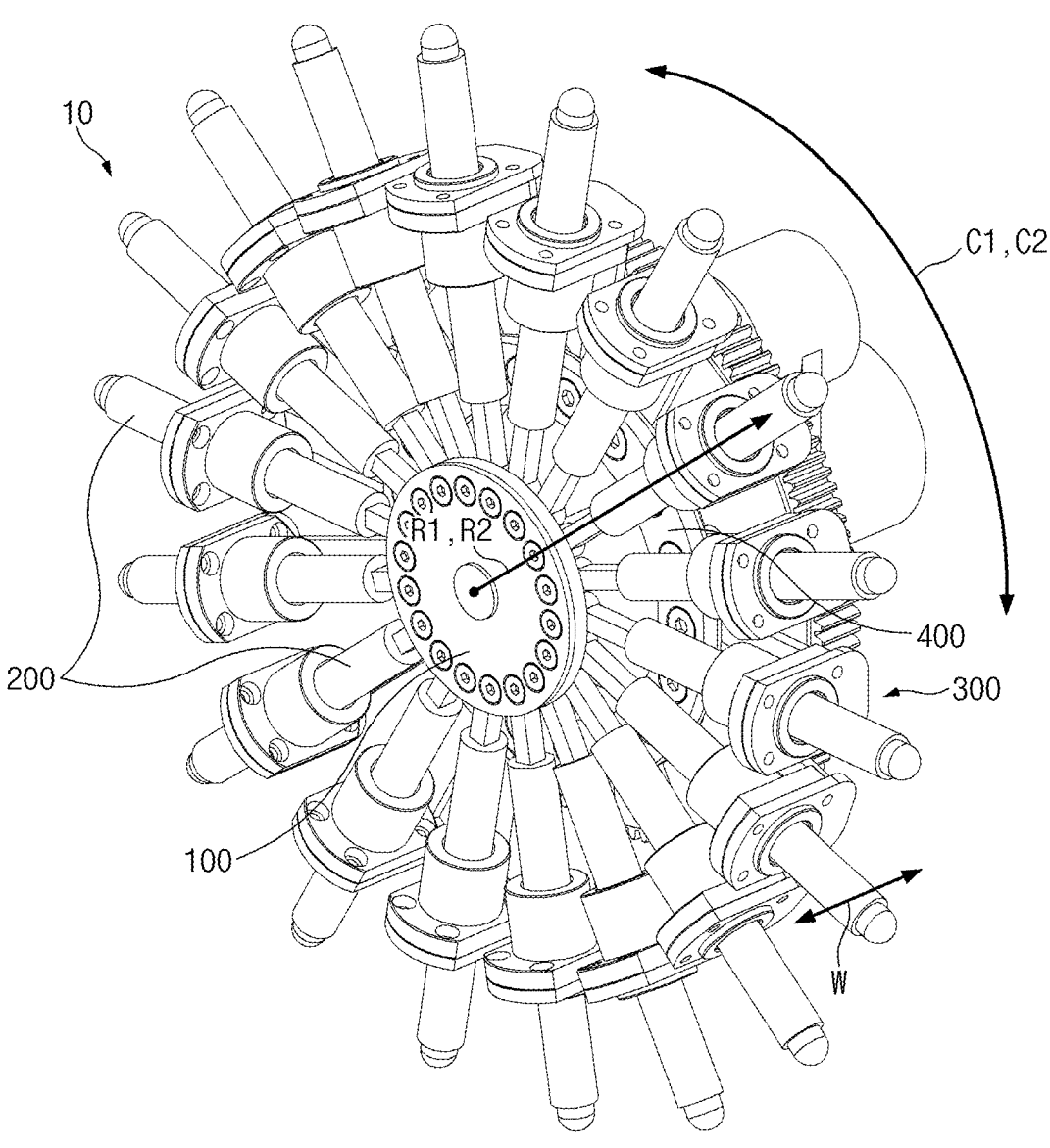
FIG. 1 is a perspective view illustrating a wheel structure according to an example of the present disclosure when viewed in a first direction.
Figure 2:
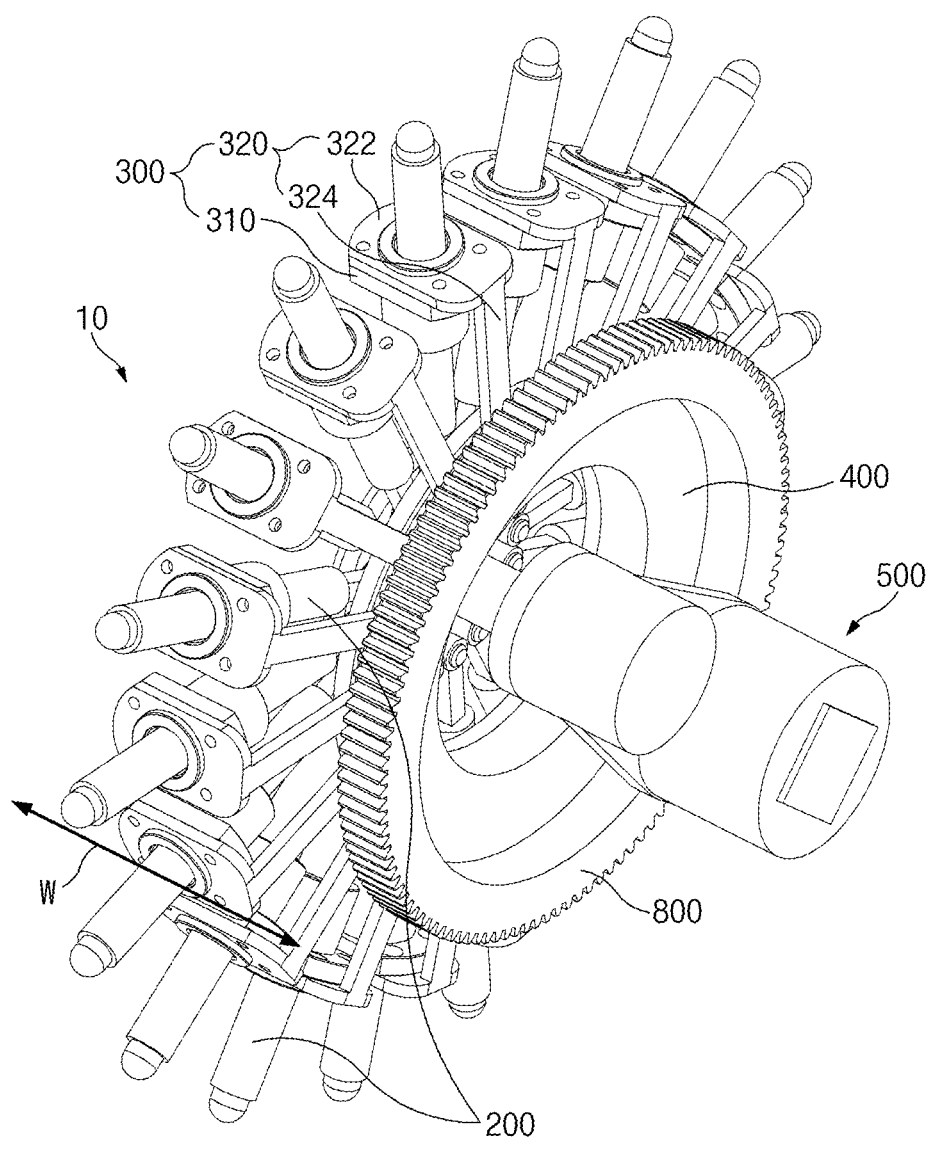
FIG. 2 is a perspective view illustrating the wheel structure according to the example of the present disclosure when viewed in a second direction.
Figure 3:
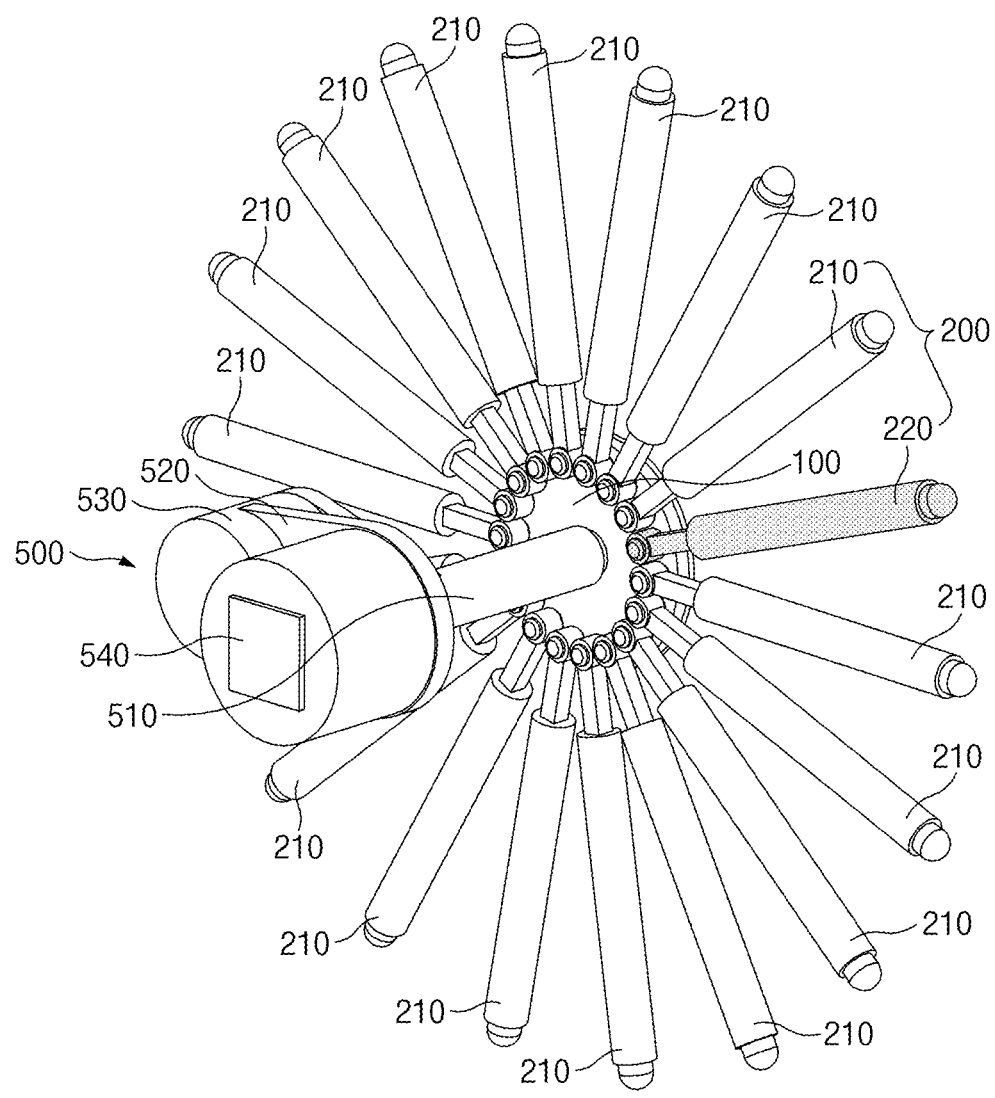
FIG. 3 is a perspective view illustrating a coupling structure between a first hub member, a spoke, and a link part provided in the wheel structure according to the example of the present disclosure.
Figure 4:
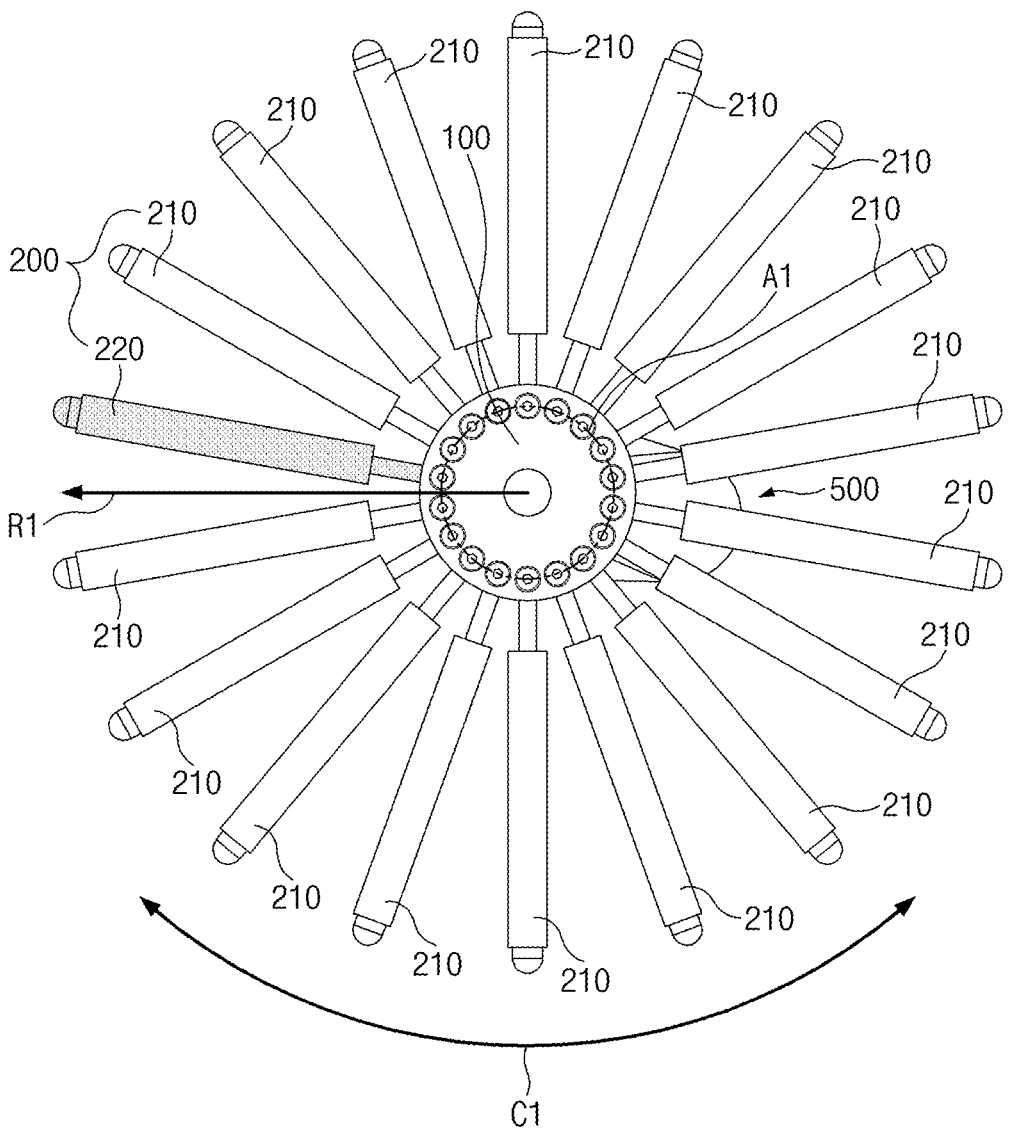
FIG. 4 is a front view illustrating the coupling structure between the first hub member, the spoke, and the link part provided in the wheel structure according to the example of the present disclosure.
Figure 5:
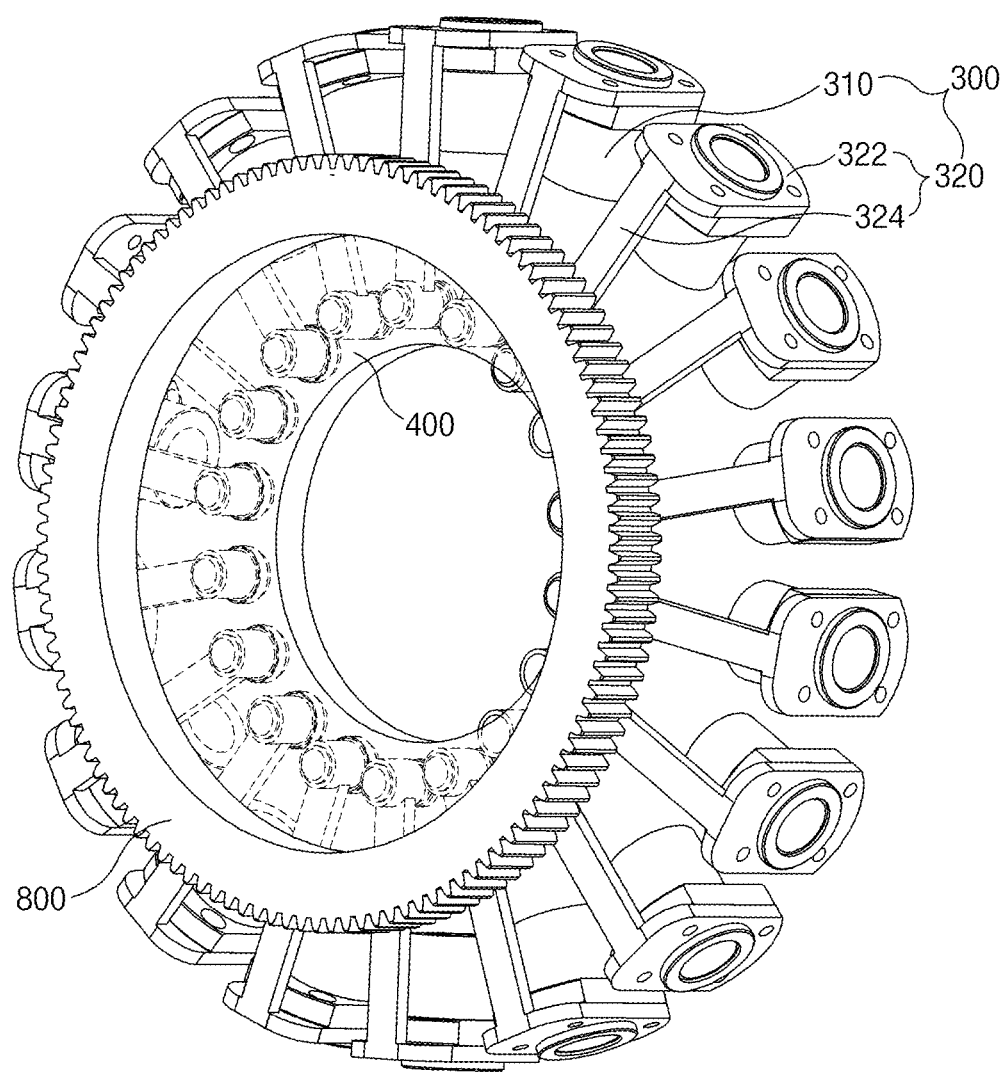
FIG. 5 is a perspective view illustrating a coupling structure between a guide part and a second hub member provided in the wheel structure according to the example of the present disclosure.
Figure 6:
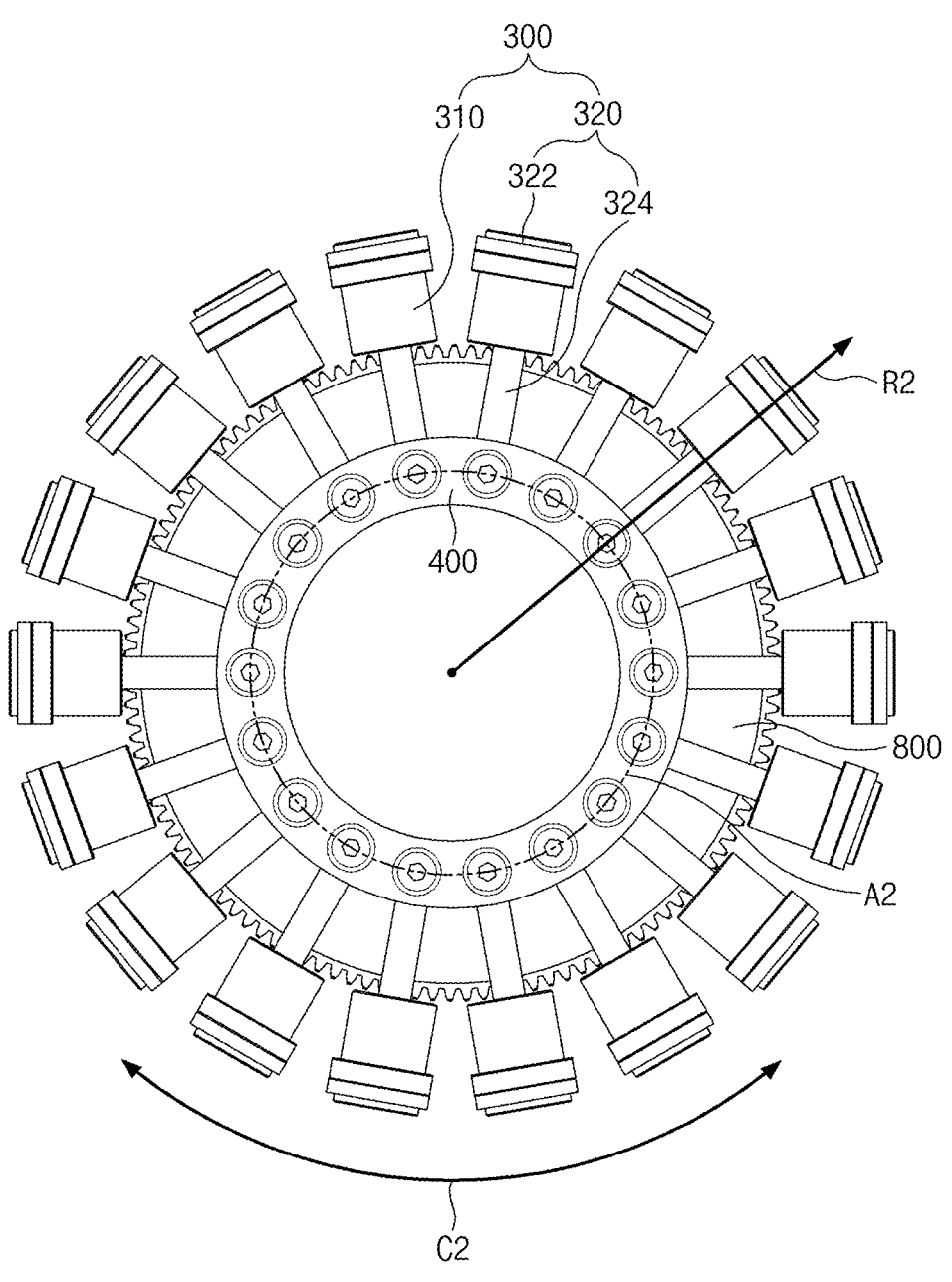
FIG. 6 is a front view illustrating the coupling structure between the guide part and the second hub member provided in the wheel structure according to the example of the present disclosure.
Figure 7:
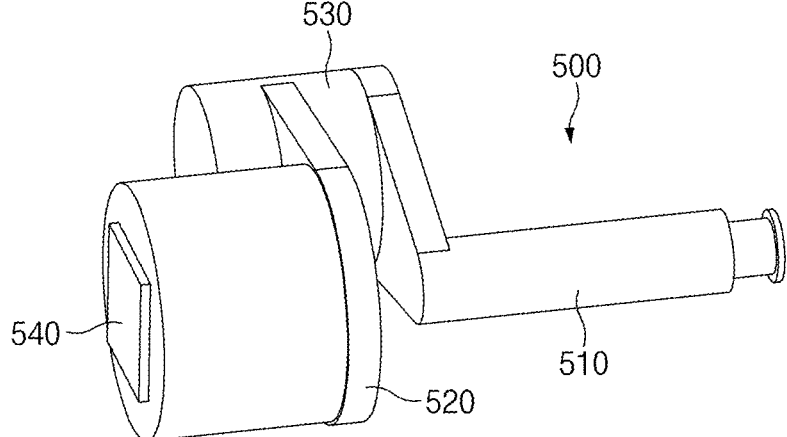
FIG. 7 is an enlarged perspective view illustrating the link part provided in the wheel structure according to the example of the present disclosure.

FIG. 1 is a perspective view illustrating a wheel structure according to an example of the present disclosure when viewed in a first direction, and FIG. 2 is a perspective view illustrating the wheel structure according to the example of the present disclosure when viewed in a second direction. FIG. 3 is a perspective view illustrating a coupling structure between a first hub member, a spoke, and a link part provided in the wheel structure according to the example of the present disclosure, and FIG. 4 is a front view illustrating the coupling structure between the first hub member, the spoke, and the link part provided in the wheel structure according to the example of the present disclosure. FIG. 5 is a perspective view illustrating a coupling structure between a guide part and a second hub member provided in the wheel structure according to the example of the present disclosure, and FIG. 6 is a front view illustrating the coupling structure between the guide part and the second hub member provided in the wheel structure according to the example of the present disclosure. FIG. 7 is an enlarged perspective view illustrating the link part provided in the wheel structure according to the example of the present disclosure.

Referring to FIG. 1, a wheel structure 10 according to the present disclosure may include a first hub member 100 (e.g., a hub), and a plurality of spokes 200 provided in a circumferential direction C1 of the first hub member 100. The plurality of spokes 200 may protrude outward from the first hub member 100 in an outward direction R1 intersecting the circumferential direction C1 of the first hub member 100. One side of each of the plurality of spokes may be coupled to the first hub member 100. Although 18 spokes 200 spaced at regular intervals in the circumferential direction C1 are illustrated in FIGS. 1 to 4, the number and arrangement of spokes 200 are not limited to the example of the drawings. The first hub member 100 may have a disk shape or a ring shape in which a hole is formed in a center thereof. In this case, the outward direction R1 of the first hub member 100 may be a radial direction of the first hub member 100.

Referring to FIGS. 1, 2, 5, and 6, the wheel structure 10 may further include guide parts 300 to which the plurality of spokes 200 may be slidably coupled. The plurality of spokes 200 may be inserted into the guide parts 300, and the spokes 200 may be able to slide relative to the guide parts 300. In this case, the number of guide parts 300 may correspond to the number of spokes 200. That is, the plurality of guide parts 300 may be provided to be coupled to the plurality of spokes 200, respectively. For example, as illustrated in FIGS. 1 to 6, when 18 spokes 200 are provided, 18 guide parts 300 are also provided, and the spokes 200 may be coupled to the guide parts 300, respectively.

Further, the wheel structure 10 may include a second hub member 400 (e.g., a hub) to which one side of each of the guide parts 300 may be rotatably coupled. In more detail, the plurality of guide parts 300 may be rotatably coupled to the second hub member 400. That is, the wheel structure 10 according to the present disclosure may be understood to have a structure in which a region in which the first hub member 100 and the spokes 200 are assembled and a region in which the second hub member 400 and the guide parts 300 are assembled may move relative to each other. Meanwhile, similar to the first hub member 100, the second hub member 400 may also have a disk shape and/or a ring shape in which a hole is formed in a center thereof.

Similar to the spokes 200, the plurality of guide parts 300 may be provided in a circumferential direction C2 of the second hub member 400. The plurality of guide parts 300 may protrude outward from the second hub member 400 in an outward direction R2 intersecting the circumferential direction C2. The plurality of guide parts 300 may have sides rotatably coupled to the second hub member 400. In a case that the second hub member 400 is a disk shape or a ring shape, the outward direction R2 of the second hub member 400 may be a radial direction of the second hub member 400.

The guide parts 300 may be divided into a plurality of regions. As illustrated in FIGS. 2, 5, and 6, each of the guide parts 300 may include an insertion member 310 (e.g., a cylinder member 310) into which the spoke 200 may be inserted and which may form a through-hole for guiding movement of the spoke 200. Each of the guide parts 300 may also include a connection member 320 having one side coupled (e.g., fixedly) to the insertion member 310 and the other side coupled (e.g., rotatably) to the second hub member 400. FIGS. 5 and 6 illustrate the insertion member 310 and the connection member 320 are separate members coupled to each other. The insertion member 310 and the connection member 320 may also, or alternatively, be integrally formed (e.g., as a single structure).

Further, the connection member 320 may be comprise a plurality of regions. The connection member 320 may include a covering region 322, which may include a region through which the insertion member 310 is configured to be inserted. The covering region 322 may be coupled (e.g., fixedly) to the insertion member 310, when inserted therein, and an extension region 324 extending from the covering region 322 toward the second hub member 400 and having one side rotatably coupled to the second hub member 400. In an example, the covering region 322 and the extension region 324 may be integrally formed. As illustrated in FIGS. 5 and 6, the extension region 324 may have a shape bent in the outward direction R2 from the covering region 322.

As indicated in FIG. 3-4, for example, one or more of the plurality of spokes 200 may be rotatably coupled to the first hub member 100, and the other(s) thereof may be fixedly coupled to the first hub member 100 in a non-rotatable manner. In more detail, the plurality of spokes 200 may include one or more rotation spokes 210 rotatably coupled to the first hub member 100 and one or more fixed spokes 220 fixedly coupled to the first hub member 100. As an example, a plurality of the rotation spokes 210 may be provided and one fixed spoke 220 may be provided. For example, FIGS. 3 and 4 illustrate a state in which 17 spokes 200 among the 18 spokes 200 are provided as the rotation spokes 210 and one spoke 200 is provided as the fixed spoke 220. In FIGS. 3 and 4, the rotation spokes 210 and the fixed spoke 220 are distinguished through shading.

The first hub member 100 and the second hub member 400 may be configured to be driven to move relative to each other. Thus, if some of the plurality of spokes 200 are provided as the rotation spokes 210, when the first hub member 100 and the second hub member 400 move relative to each other, the rotation spokes 210 rotate may relative to the first hub member 100, and thus an interval between adjacent two spokes may change.

Meanwhile, the second hub member 400 may rotate by a wheel driving motor, and accordingly, the wheel structure 10 may drive on the ground. In this case, when some (that is, the fixed spoke) of the plurality of spokes 200 are fixedly coupled to the first hub member 100, a rotational force of the second hub member 400 may be transferred to the first hub member 100 via the guide part 300 and the fixed spoke 220. Thus, the first hub member 100 may also rotate in conjunction with the rotation of the second hub member 400.

According to the present disclosure, a plane in which the plurality of spokes 200 are rotatably coupled to the first hub member 100 (e.g., a plane comprising R1 and C1) and a plane in which the plurality of guide parts 300 are rotatably coupled to the second hub member 400 (e.g., a plane comprising R2 and C2) may be formed parallel to each other. A first rotary central shaft may be formed in a region in which the plurality of spokes 200 rotate relative to the first hub member 100 and a second rotary central shaft may be provided in a region in which the plurality of guide parts 300 rotate relative to the second hub member 400. The first rotary central shaft and the second rotary central shaft may be formed parallel to each other. Thus, the first hub member 100 and the second hub member 400 may be parallel to each other. In the above description, even when a shape of the wheel structure 10 is deformed and/or changed according to a relative movement between the first hub member 100 and the second hub member 400, a rotational movement between the first hub member 100 and the rotation spoke 210, a rotational movement between the guide part 300 and the second hub member 400, and a sliding movement between the spoke 200 and the guide part 300 may be smoothly performed.

Further, as illustrated in FIGS. 3 and 4, the regions in which the plurality of spokes 200 are coupled to the first hub member 100 may be provided on a virtual first circle A1, and as illustrated in FIGS. 5 and 6, the regions in which the plurality of guide parts 300 are coupled to the second hub member 400 may be provided on a virtual second circle A2. A size of the second circle A2 may be greater than a size of the first circle A1. It may be understood that the regions in which the plurality of guide parts 300 are coupled to the second hub member 400 is provided to surround the regions in which the plurality of spokes 200 are coupled to the first hub member 100 from the outside. To achieve the above features, as illustrated in the drawings, an outer diameter of the second hub member 400 may be greater than an outer diameter of the first hub member 100. FIGS. 1 and 2 illustrate a state in which the first hub member 100 is provided in a through-hole region formed in the second hub member 400 having a ring shape when the wheel structure 10 is viewed from one side of the wheel structure 10 in a width direction W.

Referring to FIGS. 1 to 4 and 7, the wheel structure 10 may further include a link part 500 having one side coupled to the first hub member 100 and configured to move the first hub member 100 relative to the second hub member 400 (e.g., move translationally). The link part 500 may be provided such that a shape thereof may be deformed. According to the shape deformation of the link part 500, a relative movement between the first hub member 100 and the second hub member 400 may be performed. The other side of the link part 500 may be fixedly coupled to a frame part of a mobility device and/or vehicle in which the wheel structure 10 according to the present disclosure is provided.

In more detail, the link part 500 may include a plurality of link members. That is, the link part 500 may further include a first link member 510 having one side coupled to the first hub member 100 (e.g., at and/or as part of the first central rotary shaft), and a second link member 520 having one side rotatably coupled to the first link member 510 and another side coupled to the second hub member 400 (e.g., at and/or as part of the second central rotary shaft). Thus, according to the present disclosure, an angle and/or position between the first link member 510 and the second link member 520 may be varied.

The first link member 510 and the second link member 520 may be driven by a driving source provided in the link part 500. That is, the link part 500 may further include a first posture control motor 530 that rotates the first link member 510 relative to the second link member 520 and a second posture control motor 540 that rotates the second link member 520. That is, according to the present disclosure, the first link member 510 and the second link member 520 may rotate by driving the first posture control motor 530 and the second posture control motor 540. Accordingly, the shape of the link part 500 may be changed. Accordingly, a relative position between the first hub member 100 and the second hub member 400 coupled to the link part 500 may be also changed. A rotary central shaft of the second link member 520 formed in a region in which the second link member 520 rotates by the second posture control motor 540 may be formed in parallel with a rotary central shaft formed in a region in which the plurality of spokes 200 rotate about the first hub member 100 and a rotary central shaft formed in a region in which the plurality of guide parts 300 rotate about the second hub member 400. Also, a rotary central shaft of the first link member 510 formed in a region in which the first link member 510 is coupled to the second link member 520 may be formed in parallel with the rotary central shaft formed in a region in which the plurality of spokes 200 rotate about the first hub member 100 and the rotary central shaft formed in a region in which the plurality of guide parts 300 rotate about the second hub member 400.

Referring to FIGS. 1 and 2, the link part 500 may be spaced apart from the first hub member 100 and the second hub member 400 in the width direction W of the wheel structure 10. As an example, an interval between the link part 500 and the second hub member 400 in the width direction W may be smaller than an interval between the link part 500 and the first hub member 100 in the width direction W.

The wheel structure 10 according to the present disclosure may further include a wheel drive motor configured to rotate the second hub member 400. The wheel drive motor may rotate the second hub member 400 by being directly coupled to the second hub member 400 and/or may rotate the second hub member 400 through a medium member that transfers a rotational force of the wheel drive motor to the second hub member 400. As an example, the medium member may be a gear member 800 coupled to the second hub member 400 and directly or indirectly engaged with the rotary shaft of the wheel drive motor or a belt member or chain member surrounding an outer circumference of the second hub member 400 and an outer circumference of the rotary shaft of the wheel drive motor and transferring the rotational force of the wheel drive motor toward the second hub member 400. As illustrated in FIGS. 5 and 6, the gear member 800 may be fixedly coupled to the second hub member 400.

Hereinafter, a method of controlling the wheel structure according to the present disclosure will be described with reference to the drawings and the above description of the wheel structure 10.

Figure 8:
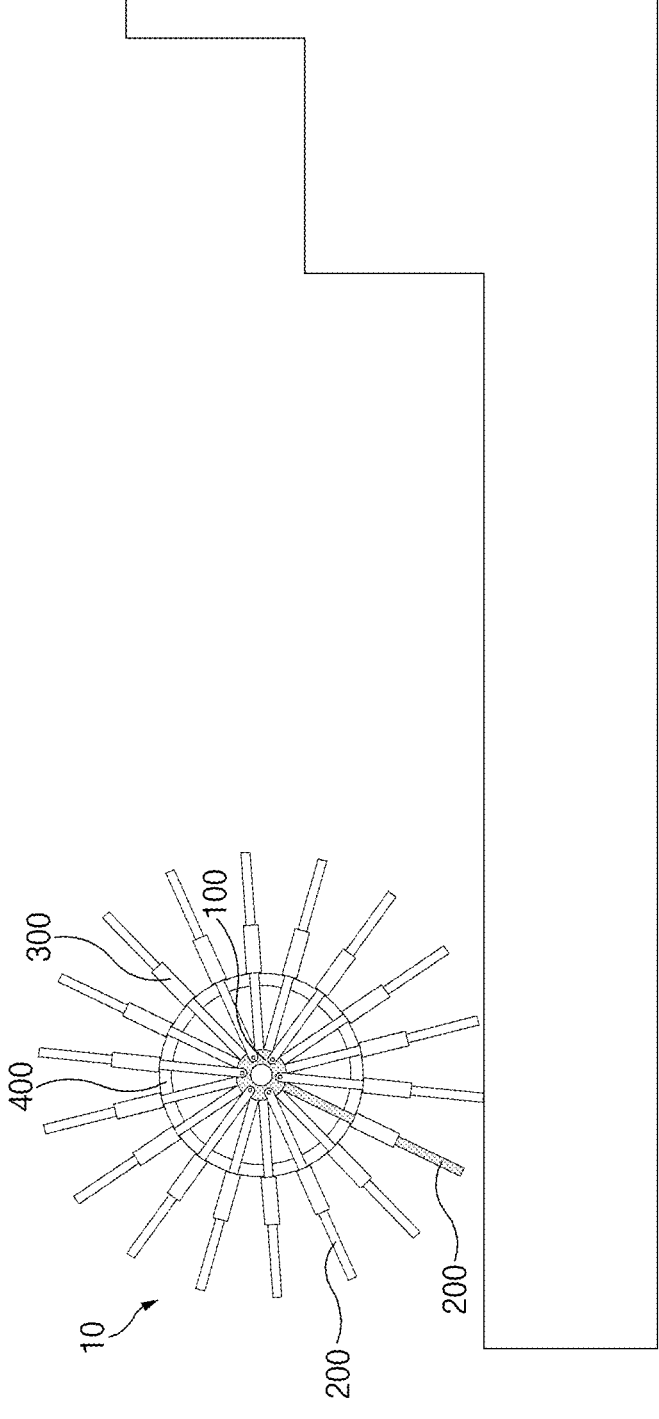
FIG. 8 is a view illustrating a state in which the wheel structure according to the present disclosure faces a stepped section protruding upward from the front side while driving on the ground.
Figure 9:
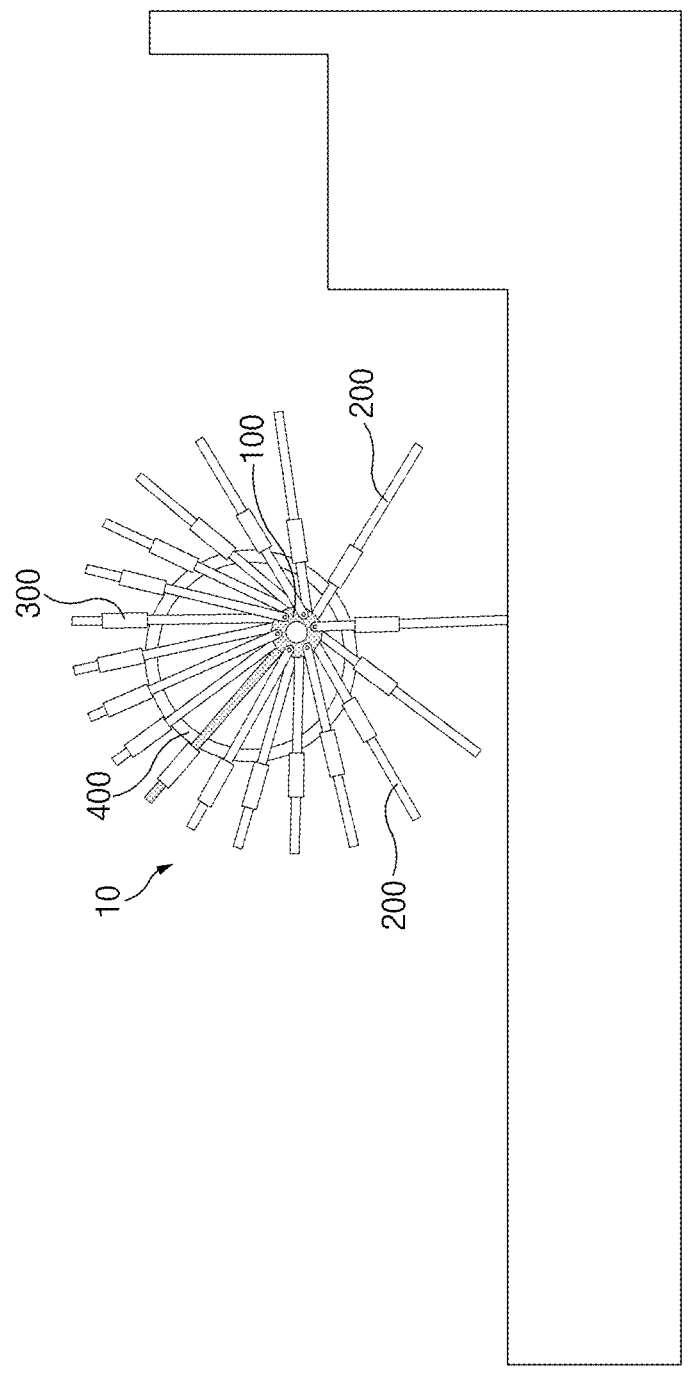
FIG. 9 is a view illustrating a state in which a posture of the wheel structure of FIG. 8 is changed by a posture control operation after a predetermined time has elapsed.
Figure 10:
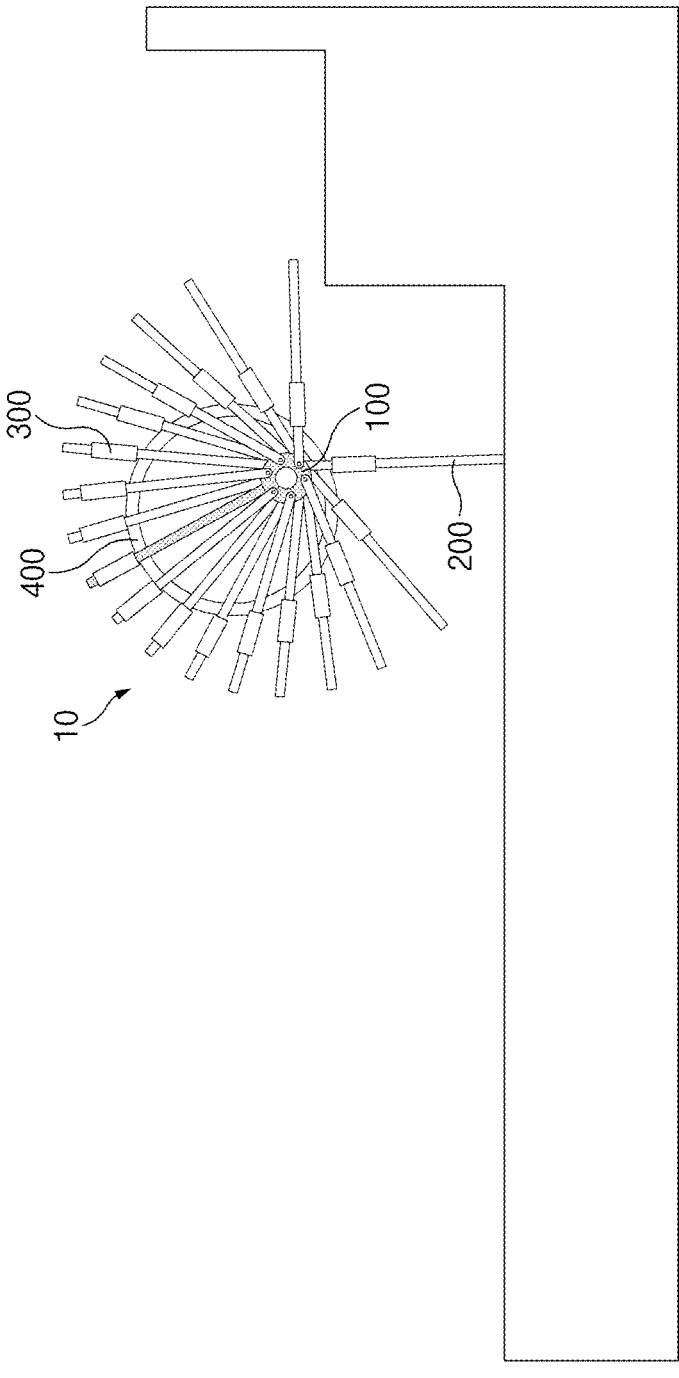
FIG. 10 is a view illustrating a state in which the wheel structure of FIG. 9 crosses the stepped section by a stepped section driving operation after a predetermined time has elapsed from the wheel structure.

FIG. 8 is a view illustrating a state in which the wheel structure according to the present disclosure faces a stepped section protruding upward from the front side while driving on the ground, and FIG. 9 is a view illustrating a state in which a posture of the wheel structure of FIG. 8 is changed by a posture control operation after a predetermined time has elapsed. FIG. 10 is a view illustrating a state in which the wheel structure of FIG. 9 crosses the stepped section by a stepped section driving operation after a predetermined time has elapsed from the wheel structure.

A method of controlling a wheel structure according to the present disclosure may include operations in which the wheel structure effectively traverses (as an example) a stepped section when the stepped section (for example, a step protruding upward) is present in front of a direction of motion of the wheel structure 10 during a driving process of the wheel structure 10.

As illustrated in FIGS. 8 to 10, the method of controlling a wheel structure according to the present disclosure may include a stepped section reaching operation in which a front portion of the wheel structure 10 approaches and/or faces the stepped section, a posture control operation of moving the second hub member 400 with respect to the first hub member 100 in an upward direction, and a stepped section driving operation of allowing the second hub member 400 to rotate and traverse the stepped section, after the posture control operation is performed.

The posture control operation may be an operation in which the second hub member 400 moves with respect to the first hub member 100 in the upward direction (e.g., away from a surface on which the wheel structure is positioned). A distance between a lower portion of the second hub member 400 and the first hub member 100 may be reduced as illustrated in FIG. 9, and an interval between the spokes 200 traversing the guide parts 300 provided in a lower region of the second hub member 400 may increase due to a restraint relationship between the spoke 200 and the guide part 300.

Thus, according to the present disclosure, in the posture control operation, a circumferential interval between the spokes facing a region facing the ground among the plurality of spokes 200 increases, and thus the wheel structure may more easily traverse the stepped section. That is, when the second hub member 400 rotates in the stepped section driving operation after the interval between the spokes 200 facing the ground increases in the posture control operation, the spokes 200 provided in a relatively wide interval are supported by the ground, the wheel structure 10 may move forward, and thus the wheel structure may easily traverse the stepped section.

Figure 11:
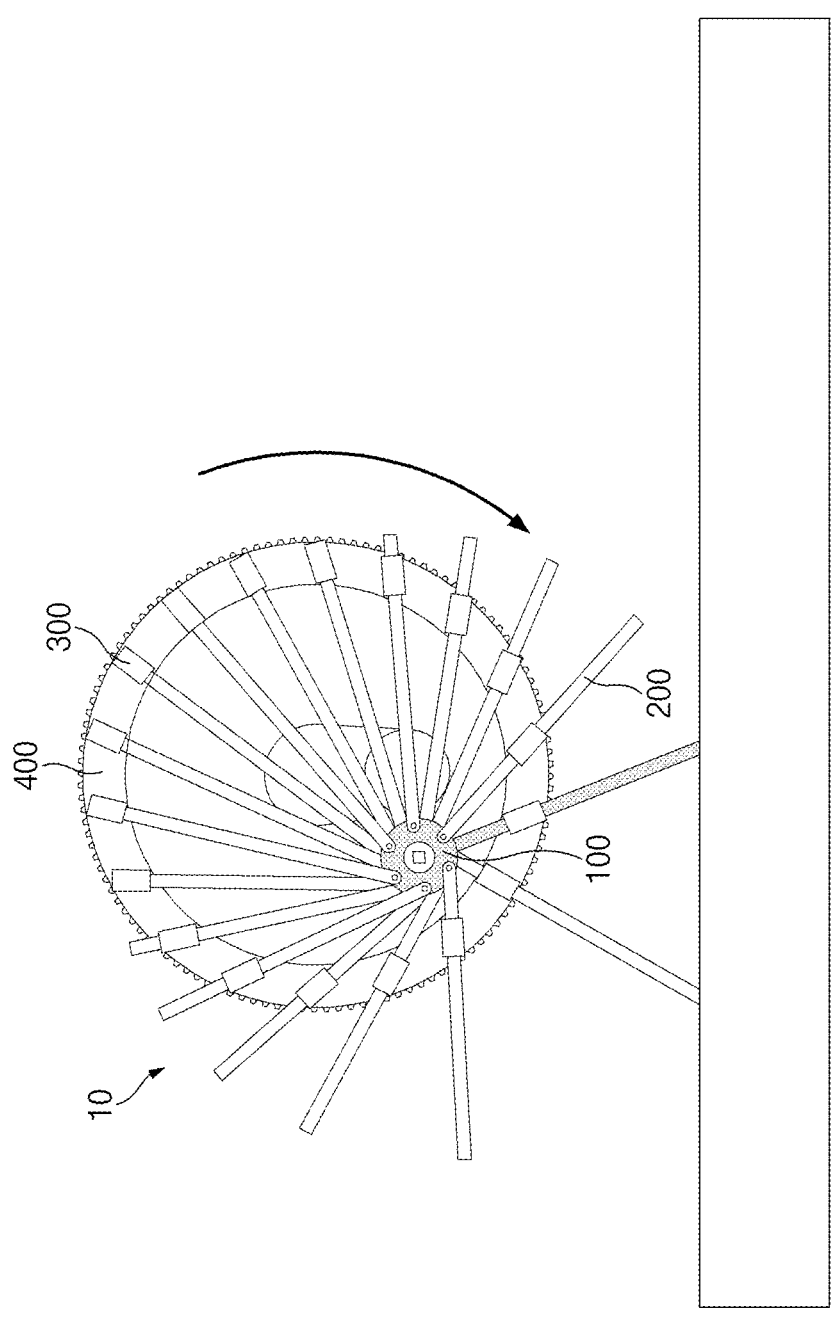
FIG. 11 is a view illustrating a state in which the first hub member moves rearward by a rearward movement operation while simulating a walking motion by the wheel structure according to the present disclosure.

The posture control operation may further include moving the second hub member 400 relative to the first hub member 100 in a rearward direction (e.g., relatively away from the stepped section, in the example of FIG. 11) as well as moving the second hub member 400 relative to the first hub member 100 in a relatively upward direction. This may allow the spoke 200 to protrude more forward from the second hub member 400 to easily traverse the stepped section in front of the wheel structure 10. The posture control operation may be performed by controlling movement of the first link member 510 and/or the second link member 520 of the link part 500. As an example, the posture control operation may include moving the first hub member 100 by rotating the first link member 510 relative to the second link member 520.

Figure 12:
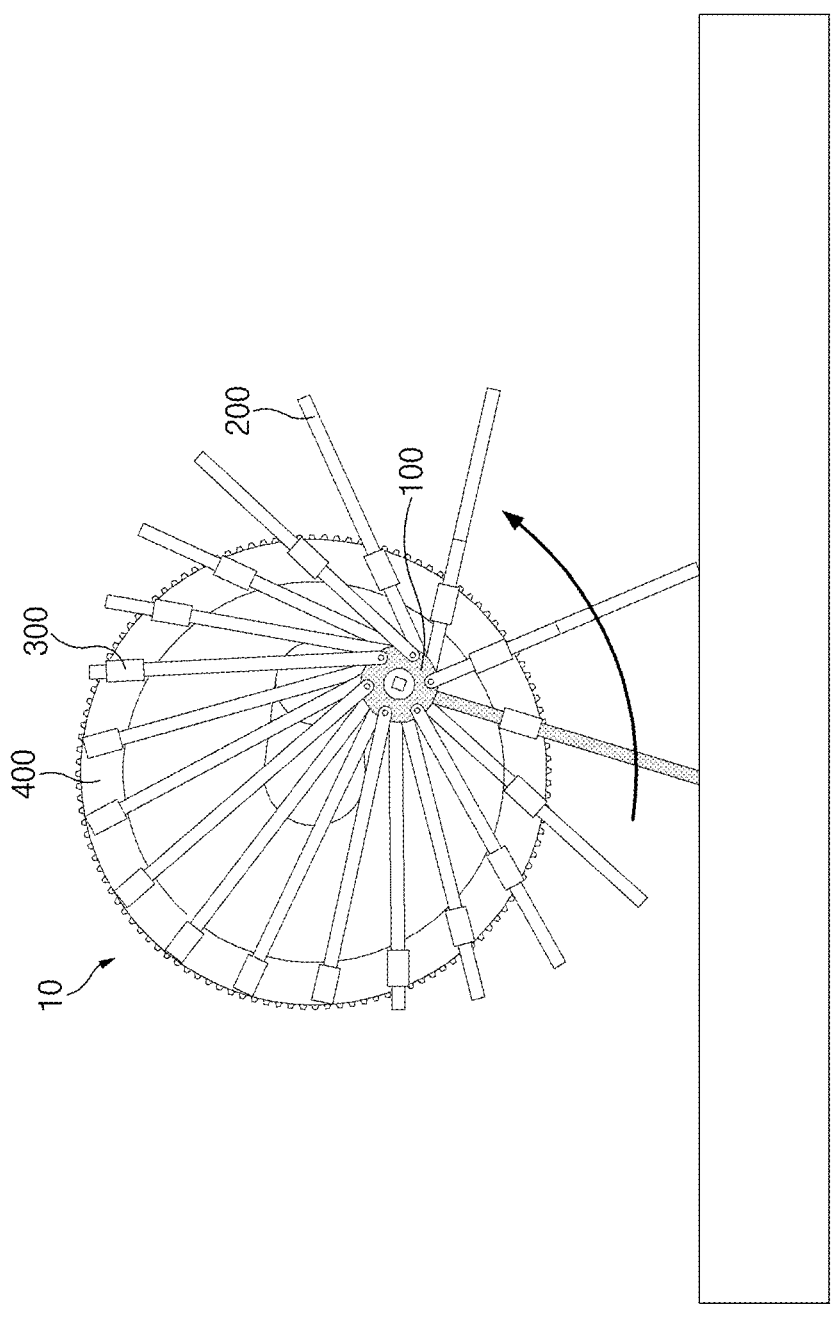
FIG. 12 is a view illustrating a state in which the first hub member moves forward by a forward movement operation while simulating a walking motion by the wheel structure according to the present disclosure.

FIG. 11 is a view illustrating a state in which the first hub member 100 moves rearward by a rearward movement operation while simulating a walking motion by the wheel structure according to the present disclosure, and FIG. 12 is a view illustrating a state in which the first hub member 100 moves forward by a forward movement operation while simulating a walking motion by the wheel structure according to the present disclosure.

Meanwhile, the wheel structure according to the present disclosure may implement a motion similar to a walking motion of a person. That is, the method of controlling a wheel structure 10 according to the present disclosure may include a rearward movement operation of moving the first hub member 100 relative to the second hub member 400 in a rearward direction, and a forward movement operation of moving the first hub member 100 relative to the second hub member 400 in a forward direction, after the rearward movement operation is performed.

In this case, the rearward movement operation may include rotating the second hub member 400 in the forward direction (e.g., a clockwise direction with reference to FIG. 11), and the forward movement operation may include rotating the second hub member 400 in the rearward direction (e.g., a counterclockwise direction with reference to FIG. 12). A rotational speed of the second hub member 400 in the rearward movement operation may be higher than a rotational speed of the second hub member 400 in the forward movement operation so that the wheel structure 10 may move forward while the rearward movement operation and the forward movement operation are alternately performed.

To simulate the walking motion of a person, the method of controlling a wheel structure according to the present disclosure may further include an upward movement operation of moving the second hub member 400 relative to the first hub member 100 in the upward direction before the rearward movement operation and the forward movement operation are performed. This may increase (e.g., maximize) the walking motion of the wheel structure 10 by increasing (e.g., maximizing) an interval between the spokes, of the plurality of spokes 200, facing the ground. For example, the upward movement operation may correspond to increasing a stride length due to an increase in a length of the leg of a person.

According to the present disclosure, a mobility device capable of fast driving on a flat ground and also walking-type motion for traversing an obstacle may comprise a wheel that may be used for a new type of mobility in which advantages of a foot-type robot and a wheel-type robot are combined can be provided.

The present disclosure has been made to solve the above-mentioned problems and to achieve various advantages.

An aspect of the present disclosure provides a mobility device (e.g., a robot and/or a vehicle) capable of fast driving on the flat ground and also walking exercise for traversing an obstacle may comprise a wheel that may be used for a new type of mobility in which advantages of a foot-type robot and a wheel-type robot may be combined.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, there is provided a wheel structure including a first hub member, a plurality of spokes that are provided in a circumferential direction (C1) of the first hub member, protrude outward from the first hub member in an outward direction (R1) intersecting the circumferential direction (C1), and have sides coupled to the first hub member, guide parts to which the plurality of spokes are slidably coupled, and a second hub member to which sides of the guide parts are rotatably coupled, wherein the plurality of spokes include a rotation spoke rotatably coupled to the first hub member.

The plurality of guide parts may be provided to be coupled to the plurality of spokes, respectively.

The plurality of spokes may further include a fixed spoke fixedly coupled to the first hub member.

The plurality of rotation spokes may be provided, and the one fixed spoke may be provided.

The guide part may include an insertion member into which the spoke is inserted and which has a through-hole configured to guide movement of the spoke, and a connection member that has one side fixedly coupled to the insertion member and the other side rotatably coupled to the second hub member.

The connection member may include a covering region which includes a region through which the insertion is inserted and is fixedly coupled to the insertion member, and an extension region extending from the covering region toward the second hub member and having one side rotatably coupled to the second hub member, and the extension region may have a shape bent from the covering region.

A plane including regions in which the plurality of spokes are rotatably coupled to the first hub member and a plane including regions in which the plurality of guide parts are rotatably coupled to the second hub member may be formed parallel to each other.

The first hub member and the second hub member may be provided parallel to each other.

Regions in which the plurality of spokes are coupled to the first hub member may be provided on a virtual first circle (A1), and regions in which the plurality of guide parts are coupled to the second hub member may be provided on a virtual second circle shape (A2).

A size of the second circle (A2) may be greater than a size of the first circle (A1).

The first hub member and the second hub member may have a disk shape or a ring shape.

An outer diameter of the second hub member may be greater than an outer diameter of the first hub member.

The wheel structure may further include a link part having one side coupled to the first hub member and provided such that a shape thereof is deformed.

The link part may include a first link member having one side coupled to the first hub member and a second link member having one side rotatably coupled to the first link member.

The link part may further include a first posture control motor configured to rotate the first link member relative to the second link member, and a second posture control motor configured to rotate the second link member.

The link part may be spaced apart from the first hub member and the second hub member in a width direction (W) of the wheel structure, and an interval between the link part and the second hub member in the width direction W is smaller than an interval between the link part and the first hub member in the width direction (W).

According to another aspect of the present disclosure, there is provided a method of controlling the wheel structure, the method including a stepped section reaching operation of allowing a front portion of the wheel structure to face a stepped section protruding upward, a posture control operation of moving the second hub member with respect to the first hub member in an upward direction, and a stepped section driving operation of allowing the second hub member to rotate and cross the stepped section.

The posture control operation may further include allowing the second hub member to move with respect to the first hub member in relatively rearward direction.

According to still another aspect of the present disclosure, there is provided a method of controlling the wheel structure, the method including a rearward movement operation of moving the first hub member relative to the second hub member in a rearward direction, and a forward movement operation of moving the first hub member relative to the second hub member after the rearward movement operation, wherein the rearward movement operation further includes rotating the second hub member in a forward movement direction, and the forward movement operation further includes rotating the second hub member in a rearward movement direction.

The method may further include an upward movement operation of moving the second hub member relative to the first hub member in an upward direction before the rearward movement operation and the forward movement operation are performed.

As described above, although the present disclosure has been described with reference to the certain examples and drawings, the present disclosure is not limited thereto. Those skilled in the art to which the present disclosure belongs could derive various implementations, variations, and modifications from the described examples without departing from the technical spirit of the present disclosure and the equivalents of the appended claims.

What is claimed is:

1. A wheel structure comprising:
   a first hub;
   a plurality of spokes coupled to the first hub such that the plurality of spokes are provided along a circumferential direction of the first hub and protrude outward from the first hub;
   a plurality of guide parts to which the plurality of spokes are slidably coupled; and
   a second hub to which sides of the guide parts are rotatably coupled,
   wherein the plurality of spokes comprise a rotation spoke rotatably coupled to the first hub.

2. The wheel structure of claim 1, wherein the plurality of guide parts are coupled to the plurality of spokes in a one-to-one fashion.

3. The wheel structure of claim 2, wherein each of the plurality of guide parts comprises:
   an insertion member that forms a through-hole into which a spoke of the plurality of spokes is inserted, wherein the through-hole is configured to guide movement of the spoke; and
   a connection member comprising one side fixedly coupled to the insertion member and another side rotatably coupled to the second hub.

4. The wheel structure of claim 3, wherein the connection member comprises:
   a covering region fixedly coupled to the insertion member and comprising a region through which the insertion member is inserted; and
   an extension region extending from the covering region toward the second hub and having one side rotatably coupled to the second hub, wherein the extension region has a shape bent from the covering region.

5. The wheel structure of claim 2, wherein a plane comprising regions in which the plurality of spokes are rotatably coupled to the first hub is parallel to a plane comprising regions in which the plurality of guide parts are rotatably coupled to the second hub.

6. The wheel structure of claim 2, wherein the first hub and the second hub are parallel to each other.

7. The wheel structure of claim 1, wherein the plurality of spokes further comprise a fixed spoke fixedly coupled to the first hub.

8. The wheel structure of claim 7, wherein the plurality of spokes comprise a plurality of rotation spokes.

9. The wheel structure of claim 1, wherein regions in which the plurality of spokes are coupled to the first hub are provided on a virtual first circle, and regions in which the plurality of guide parts are coupled to the second hub are provided on a virtual second circle.

10. The wheel structure of claim 9, wherein a size of the virtual second circle is greater than a size of the virtual first circle.

11. The wheel structure of claim 1, wherein the first hub and the second hub each independently have a disk shape or a ring shape.

12. The wheel structure of claim 11, wherein an outer diameter of the second hub is greater than an outer diameter of the first hub.

13. The wheel structure of claim 1, further comprising:
a link part having one side coupled to the first hub and configured to allow a shape of the wheel structure to be deformed.

14. The wheel structure of claim 13, wherein the link part comprises:
a first link having one side coupled to the first hub; and
a second link having one side rotatably coupled to the first link.

15. The wheel structure of claim 14, wherein the link part further comprises:
a first posture control motor configured to rotate the first link relative to the second link; and
a second posture control motor configured to rotate the second link.

16. The wheel structure of claim 13, wherein the link part is spaced apart from the first hub and the second hub in a width direction of the wheel structure, and
wherein an interval between the link part and the second hub in the width direction is smaller than an interval between the link part and the first hub in the width direction.

17. A method comprising:
causing a front portion of a wheel structure to approach a stepped section protruding upward, wherein the wheel structure comprises:

a first hub;
a plurality of spokes coupled to the first hub such that the plurality of spokes are provided along a circumferential direction of the first hub and protrude outward from the first hub;
a plurality of guide parts to which the plurality of spokes are slidably coupled; and
a second hub to which sides of the guide parts are rotatably coupled, wherein the plurality of spokes comprise a rotation spoke rotatably coupled to the first hub;
moving the second hub with respect to the first hub in an upward direction; and
causing the second hub to rotate onto the stepped section.

18. The method of claim 17, wherein the moving the second hub with respect to the second hub comprises moving the second hub with respect to the first hub in a rearward direction.

19. A method of controlling a wheel structure, wherein the wheel structure comprises:
a first hub,
a plurality of spokes coupled to the first hub such that the plurality of spokes are provided along a circumferential direction of the first hub and protrude outward from the first hub,
a plurality of guide parts to which the plurality of spokes are slidably coupled and
a second hub to which sides of the guide parts are rotatably coupled, wherein the plurality of spokes comprise a rotation spoke rotatably coupled to the first hub,
the method comprising:
moving the first hub relative to the second hub in a rearward direction;
rotating the second hub in a forward movement direction; and
after the moving the first hub relative to the second hub in the rearward direction, moving the first hub relative to the second hub; and
rotating the second hub in a rearward movement direction.

20. The method of claim 19, further comprising:
moving the second hub relative to the first hub in an upward direction before the moving the first hub relative to the second hub in the rearward direction.

* * * * *